United States Patent Office 3,310,299
Patented Mar. 21, 1967

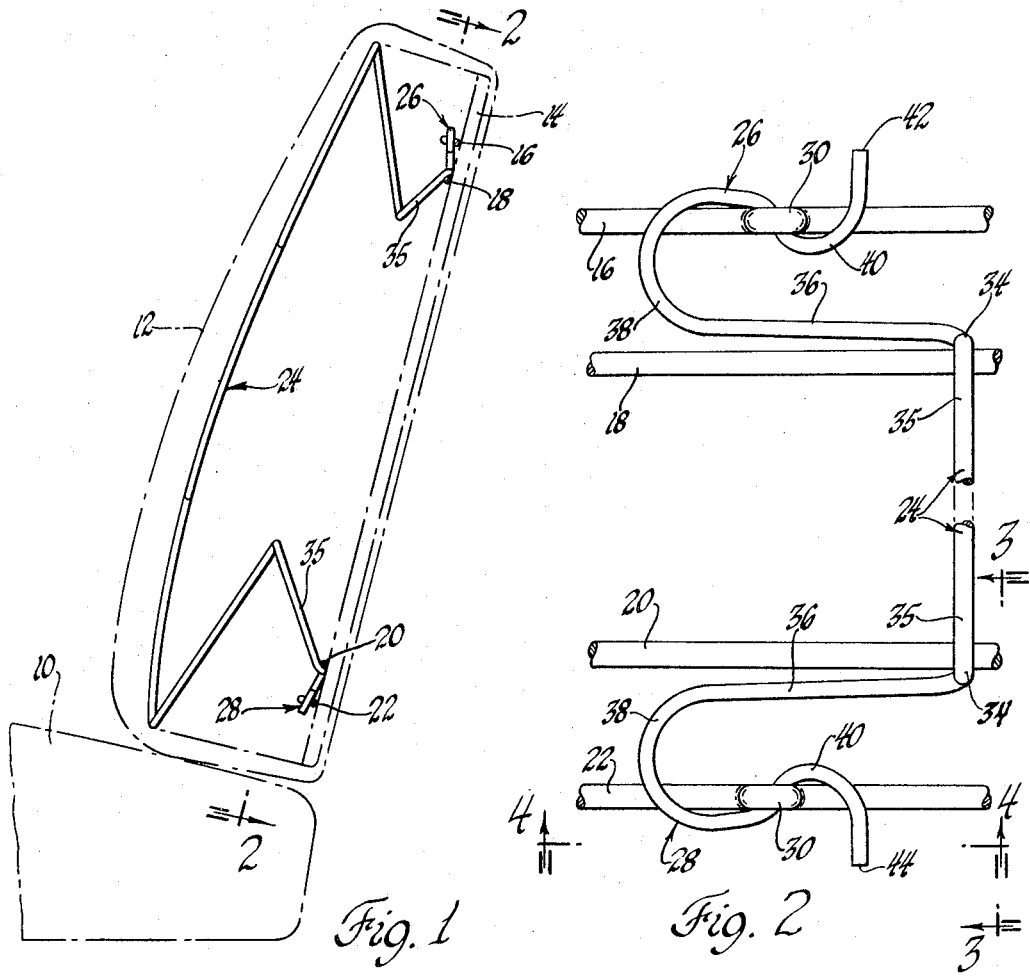
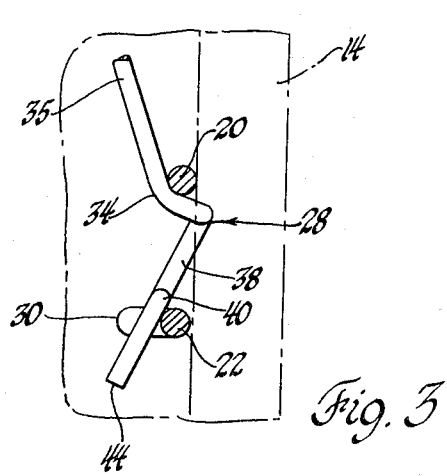
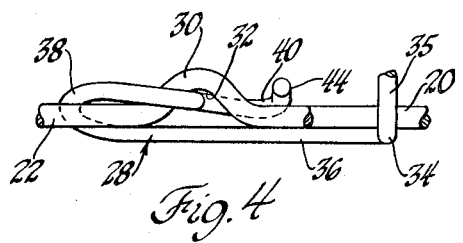

3,310,299
SEAT SPRING ATTACHMENT
Harold E. Rose, Royal Oak, Mich., assignor to General Motors Corporation, Detroit, Mich., a corporation of Delaware
Filed Dec. 8, 1965, Ser. No. 512,379
4 Claims. (Cl. 267—110)

This invention relates to seat spring structures and more particularly to an improved seat spring attaching means for an assembly commonly used in automobile seats in which the trim fabrics of seat pads are supported by generally parallel zig-zag or sinuous wires that extend across the seat frame.

The invention disclosed herein in its preferred embodiment is shown in the seat back construction although the principles thereof are also applicable to seat bottoms.

The principal objects of this invention are to facilitate the manufacture of a seat spring assembly and more particularly the assembly thereof whereby a comfortable seat spring structure is provided.

A great many forms and arrangements of seat springs of the type referred to have been proposed and used in production. One common method of retaining the end of the supporting seat spring on its parallel supporting wires or rods is to provide a plurality of loops and flattened holding portions on the parallel support rods in which the end of the support spring is snapped to its retention position.

It is an object of this invention to provide a retaining method for the ends of the seat springs in which an offset is provided in the spring which falls behind the frame rod or wire to allow the springs to lock without the need of the "snap-in" features required in the present production seat springs.

A further object of this invention is to provide a method for attaching the ends of the seat springs which will speed assembly operations and minimize the effort required of the assembler.

These and other objects of this invention will become more apparent as reference is had to the accompanying drawings and specification in which FIGURE 1 is a side view of a vehicle seat, with parts cut away, and illustrating a seat spring utilizing the present invention for attaching the ends of the seat spring to the seat frame.

FIGURE 2 is a view substantially along the line 2—2 of FIGURE 1, in the direction of the arrows, showing hows the ends of the wire are assembled to the horizontal cross rods of the frame.

FIGURE 3 is a view substantially along the line 3—3 of FIGURE 2, in the direction of the arrows, illustrating the manner in which the end of the seat spring is attached to the parallel cross rods of the seat frame.

FIGURE 4 is a view substantially along the line 4—4 of FIGURE 2, in the direction of the arrows, illustrating the manner in which the end of the support spring is positioned above and below the cross rods of the seat frame.

Referring now to the drawings, as best seen in FIGURE 1, the automobile seat illustrated is comprised of a seat cushion 10 and a seat back cushion 12, the seat cushion being mounted in a conventional manner on a support platform, not shown, and the seat back cushion being mounted in an upright manner adjacent to the seat cushion. The seat back cushion 12 includes a seat back frame 14 to which is attached two pairs of parallel rods 16, 18 and 20, 22, respectively.

A plurality of zig-zag or formed wire support springs 24 are generally in a plane parallel to the frame 14 and extend from top to bottom of the frame. At the top and bottom, the wires 24 are supported on the frame 14 by a fish mouth or generally V shaped wire configuration. One end of each of the V's supports an end of the load bearing portion of the wire 24 and the other end of the V's terminate in end portions 26 and 28 which are attached to the parallel rods 16, 18 and 20, 22, respectively, for supporting the support wire on the frame. Since the end portions 26 and 28 are turned left and right but otherwise identical, only the manner in which end portion 28 is formed and attached to rods 22 and 20 will be described. The rod 22 closest the parallel frame portion of the seat back is formed with an offset 30 that is approximately perpendicular to the plane of the seat back frame 14, there being such an offset for each of the wires 24. The underside of this offset 30 provides a notch 32 within which the end portion 28 is positioned.

The end portion 28 that is attached to the rods 20, 22 includes an offset 34 in the straight wire portion 35 leading from the support V, a straight wire portion 36 leading from the offset 34 to a 180° loop 38, the other side of the loop 38 terminating in a hook end portion 40. The straight portion 36, loops 38 and hook 40 are formed in substantially the same plane.

To assemble the support spring 24 on the rods 16, 18 and 20, 22, the loops 38 are placed over the outer rods 16 and 22 at substantially a right angle, the hook portions 40 are biased towards the straight portion 36 until the ends 42 and 44 clear rods 16 and 22, respectively, at which time the spirng 24 is rotated until a portion of the hook 40 is seated in the notch 32 and the ends 42 and 44 are above the rods 22 and 16, respectively, at which time the hooks 40 are released to seat over the rods 16 and 22, to complete the assembly. Thus, it can be seen that without the necessity of complicated mounting tools the spring 24 may be easily positioned on the seat back frame.

In the assembled position, as best seen in FIGURES 2 through 4, a portion of the curved section of loop 38 is overlaying the notched rod adjacent the offset 30 with the portion of the hook 40 closest the loop 38 passing beneath rod 22 through the notch 32 and the other end of hook 40 resting above rod 22 adjacent the offset 30. The manner in which the loop 38 and hook 40 are intertwined with rod 22 prevents rotation of the end 28 about the axis of rod 22. The end portion 28 is further supported on rods 20, 22 by the straight wire 35 bearing on straight rod 20 adjacent offset 34. Lateral movement of the end portion 28 in one direction is prevented by the hook 40 bearing on rods 22, and in the other direction by the offset 34 bearing against rods 20.

While but one embodiment of the invention has been shown and described, it will be evident that numerous changes and modifications may be made therein. It is, therefore, to be understood that it is not intended to limit this invention to the embodiments shown but only by the scope of the claims which follow.

I claim:

1. In combination in a seat assembly having a generally rectangular frame, a plurality of generally parallelly formed support wires extending across said frame and having the ends thereof secured to said frame, and means for attaching the end of each of said support wires to said frame for supporting said wires on said frame, said attaching means including a pair of generally parallel rods secured to said frame adjacent one side thereof, the rod adjacent the side of said frame having a plurality of notches formed generally at right angles to the frame for each support wire, each of said notches coacting with an end of a support wire for securing said support wire at properly spaced intervals on said frame, the other rod being substantially straight, said wire end including an offset portion bearing against said straight rod, and a 180° loop having a hook on one arm thereof for looping through said notch and a straight wire portion on the other arm extending between said offset portion and said loop.

2. A seat assembly as claimed in claim 1 wherein said straight wire portion, said loop and said hook are substantially in the same plane.

3. A seat assembly as claimed in claim 1 wherein said straight wire portion is generally parallel to and adjacent said straight rod and positioned below the plane of said parallel rods, a portion of said loop and said hook are positioned above the plane of said parallel rods, and said straight wire portion, said loop and said hook portion are substantially in the same plane.

4. A seat assembly as claimed in claim 1 wherein said offset portion is positioned substantially perpendicular to said straight wire portion.

References Cited by the Examiner
UNITED STATES PATENTS
2,810,431  10/1957  Boretti _____ 267—107

ARTHUR L. LA POINT, *Primary Examiner.*